US009333958B2

(12) United States Patent
Squarcini et al.

(10) Patent No.: US 9,333,958 B2
(45) Date of Patent: May 10, 2016

(54) PNEUMATIC BRAKE ASSISTANCE ARRANGEMENT

(75) Inventors: Raffaele Squarcini, Livorno (IT); Elisa Bartalesi, San Gimignano (IT); Francesco Bucchi, Pisa (IT)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 0 days.

(21) Appl. No.: 14/422,704

(22) PCT Filed: Aug. 23, 2012

(86) PCT No.: PCT/EP2012/066463
§ 371 (c)(1),
(2), (4) Date: May 28, 2015

(87) PCT Pub. No.: WO2014/029444
PCT Pub. Date: Feb. 27, 2014

(65) Prior Publication Data
US 2015/0251644 A1    Sep. 10, 2015

(51) Int. Cl.
*B60T 13/52* (2006.01)
*B60T 17/02* (2006.01)
*F16D 37/02* (2006.01)
(Continued)

(52) U.S. Cl.
CPC ............... *B60T 13/52* (2013.01); *B60T 17/02* (2013.01); *F16D 37/02* (2013.01); *B60T 8/448* (2013.01); *F16D 25/06* (2013.01); *F16D 27/01* (2013.01); *F16D 2037/002* (2013.01)

(58) Field of Classification Search
CPC ......... B60T 13/52; B60T 17/02; B60T 8/448; F16D 37/02; F16D 27/01; F16D 2037/002

USPC .................. 192/3.56, 222, 54.4, 58.61, 84.3
See application file for complete search history.

(56) References Cited

U.S. PATENT DOCUMENTS 5,598,908 A * 2/1997 York ....................... F16D 37/02
188/267
5,848,678 A * 12/1998 Johnston ................. F16D 37/02
188/267.2
(Continued)

FOREIGN PATENT DOCUMENTS

DE   10 2007 020 867 A1   11/2008
EP       0 553 010 A1    7/1993
(Continued)

*Primary Examiner* — Thomas Irvin
(74) *Attorney, Agent, or Firm* — Norman B. Thot

(57) ABSTRACT

A pneumatic brake assistance arrangement includes a vacuum brake assistance unit comprising a vacuum chamber, and a vacuum pump. The vacuum pump comprises an input shaft, a pumping unit, and a magneto-rheological clutch. The pumping unit comprises a pump rotor and a suction port connected to the vacuum chamber. The magneto-rheological clutch comprises an input clutch body, an output clutch body, a closed clutch liquid gap, a permanent magnet element, and a pneumatic control circuit. The permanent magnet element shifts between an engaged and a disengaged position. The pneumatic control circuit moves the permanent magnet element between the engaged and the disengaged position. The pneumatic control circuit comprises a pneumatic actuation chamber comprising a piston and a passive pretension element. The pneumatic actuation chamber is connected to the vacuum chamber. The piston shifts the permanent magnet element into the engaged position when a high pressure exists in the vacuum chamber.

7 Claims, 2 Drawing Sheets

(51) Int. Cl.
*F16D 27/01* (2006.01)
*B60T 8/44* (2006.01)
*F16D 25/06* (2006.01)
*F16D 37/00* (2006.01)

(56) References Cited

U.S. PATENT DOCUMENTS

| | | | |
|---|---|---|---|
| 7,422,093 | B2 | 9/2008 | Murty et al. |
| 7,891,474 | B2 * | 2/2011 | McDaniel ............... F16D 37/02 188/267.2 |
| 2002/0096132 | A1 | 7/2002 | Stretch et al. |
| 2009/0022606 | A1 * | 1/2009 | Togawa ..................... F01P 5/12 417/364 |
| 2009/0266666 | A1 | 10/2009 | McDaniel |
| 2015/0044069 | A1 * | 2/2015 | Squarcini ................ F04D 25/02 417/223 |
| 2015/0260240 | A1 * | 9/2015 | Squarcini ................ F16D 37/02 417/319 |

FOREIGN PATENT DOCUMENTS

| | | |
|---|---|---|
| FR | 1.101.667 A | 10/1955 |
| GB | 708557 | 5/1954 |
| GB | 2 211 572 A | 7/1989 |
| JP | 61-248924 A | 11/1986 |

* cited by examiner

PNEUMATIC BRAKE ASSISTANCE ARRANGEMENT

CROSS REFERENCE TO PRIOR APPLICATIONS

This application is a U.S. National Phase application under 35 U.S.C. §371 of International Application No. PCT/EP2012/066463, filed on Aug. 23, 2012. The International Application was published in English on Feb. 27, 2014 as WO 2014/029444 A1 under PCT Article 21(2).

FIELD

The present invention relates to a pneumatic brake assistance arrangement consisting of a vacuum brake assistance unit and a mechanical vacuum pump providing vacuum for the brake assistance unit and being driven directly by a combustion engine.

BACKGROUND

Common vacuum pumps for providing vacuum for a pneumatic brake assistance unit are mechanical vacuum pumps which are directly driven by the internal combustion engine. The term "directly driven" here means that no disengagable clutch exists between the rotational element of the engine and the input shaft of the pump. The input shaft of the pump can be driven by the engine via a belt, gear wheels, or by a direct coupling with the camshaft or the crankshaft of the engine. If no clutch is provided between the input shaft of the vacuum pump and the pump rotor, the vacuum pump is always driven by the engine even if no performance of the vacuum pump is needed.

A clutch can be provided between the input shaft of the vacuum pump and the pumping unit comprising the pump rotor in order to reduce unnecessary wear of the vacuum pump and to reduce energy consumption of the vacuum pump. The clutch is disengaged if no pumping performance of the vacuum pump is needed.

SUMMARY

An aspect of the present invention is to provide a reliable pneumatic brake assistance arrangement with a simple and reliable control of the clutch.

In an embodiment, the present invention provides a pneumatic brake assistance arrangement for an internal combustion engine which includes a pneumatic conduit, a vacuum brake assistance unit comprising a vacuum chamber, and a vacuum pump. The vacuum pump comprises an input shaft configured to be directly driven by the internal combustion engine, a pumping unit, and a magneto-rheological clutch. The pumping unit comprises a pump rotor and a suction port. The vacuum chamber of the vacuum brake assistance unit is connected with the suction port of the pumping unit. The magneto-rheological clutch is arranged between the input shaft and the pump rotor. The magneto-rheological clutch comprises an input clutch body, an output clutch body, a closed clutch liquid gap, a permanent magnet element, and a pneumatic control circuit. The closed clutch liquid gap is arranged between the input clutch body and the output clutch body. The closed clutch liquid gap is filled with a magneto-rheological clutch liquid. The permanent magnet element is configured to be shiftable between an engaged position wherein a magnetic field of the permanent magnet element penetrates the closed clutch liquid gap with a high magnetic flux, and a disengaged position, wherein the magnetic field of the permanent magnet element is less than in the engaged position. The pneumatic control circuit is configured to move the permanent magnet element between the engaged position and the disengaged position. The pneumatic control circuit comprises a pneumatic actuation chamber comprising a piston and a passive pretension element. The pneumatic actuation chamber is connected to the vacuum chamber of the vacuum brake assistance unit via the pneumatic conduit. The piston is configured to directly shift the permanent magnet element into the engaged position when a high pressure exists in the vacuum chamber. The passive pretension element is configured to pretention the piston so that the permanent magnet element is in the disengaged position or in the engaged position.

BRIEF DESCRIPTION OF THE DRAWINGS

The present invention is described in greater detail below on the basis of embodiments and of the drawings in which.

DETAILED DESCRIPTION

Figure 1:
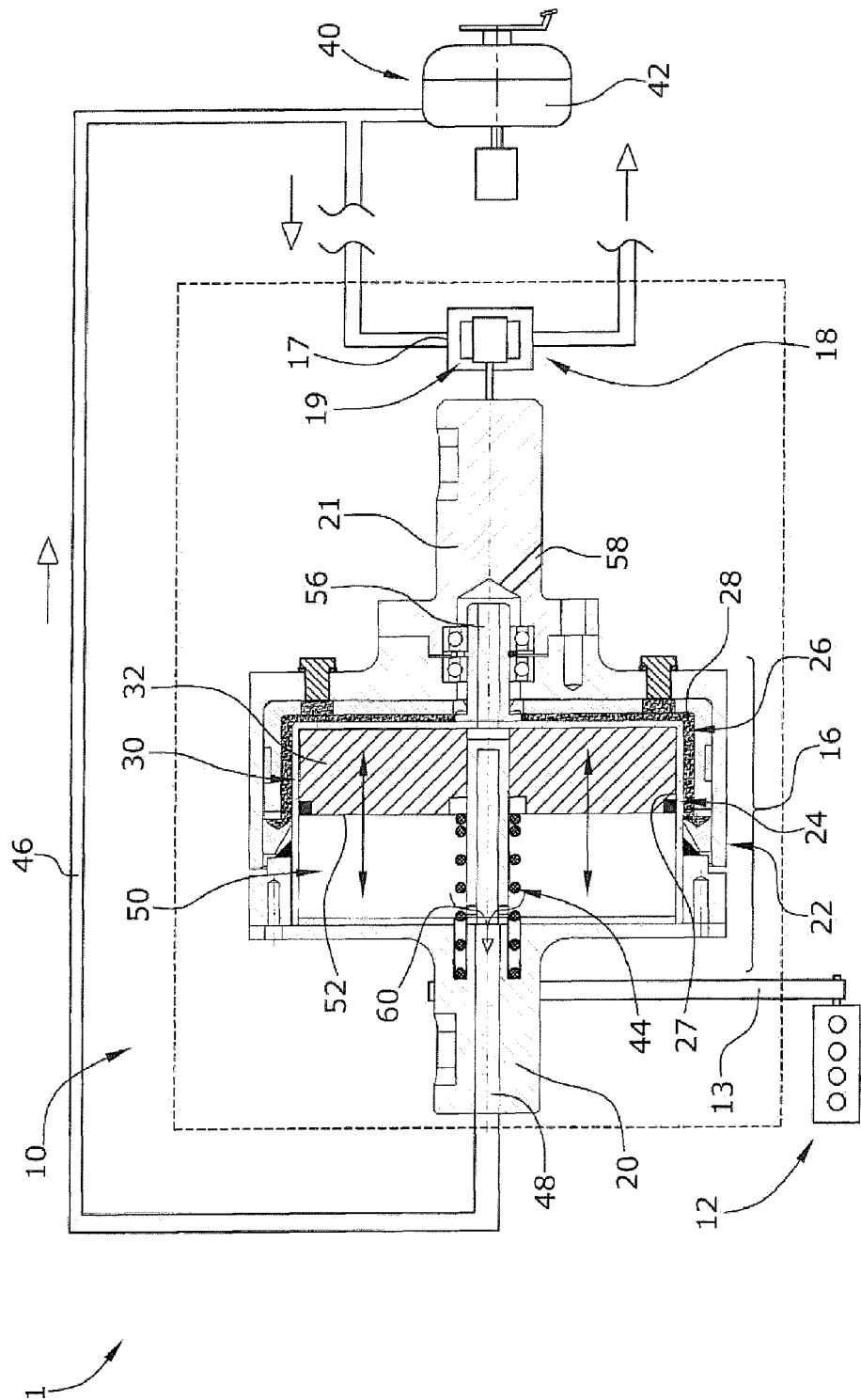
FIG. 1 shows a pneumatic brake assistance arrangement including a vacuum pump with an engaged magneto-rheological clutch in longitudinal section.

The pneumatic brake assistance arrangement is provided with a mechanical switchable vacuum pump driven by the internal combustion engine and with a vacuum brake assistance unit. The brake assistance unit is provided with a vacuum chamber which is connected with a suction port of the pumping unit of the vacuum pump. The vacuum chamber of the brake assistance unit serves as a brake energy accumulator. The absolute pressure in the brake assistance vacuum chamber should always be below a defined absolute maximum pressure value of, for example, 100 mbar so as to always provide enough braking force support. The vacuum pump comprises a clutch and a pumping unit. The clutch is arranged between the input shaft of the vacuum pump and the pumping unit so that the pumping unit is not driven if the clutch is disengaged.

The clutch is a magneto-rheological clutch whereby the clutch is engaged and disengaged by a movable permanent magnet element. The clutch is provided between the input shaft and the pump rotor and comprises a clutch liquid gap between two clutch bodies. One clutch body is directly connected to the input shaft and the other clutch body is directly connected to the pump rotor. The clutch liquid gap between the two clutch bodies is filled with a magneto-rheological clutch liquid which has a relatively high viscosity when a magnetic field is present and which has a relatively low viscosity when no magnetic field is present. The term "liquid" when used in context with the magneto-rheological liquid is not to be taken literally, but is to be understood as a kind of a magneto-rheological fluid which can also be somehow solid when activated by a magnetic field.

The magnetic field for increasing the viscosity of the magneto-rheological clutch liquid is generated by a permanent magnet element which is shiftable between a disengaged position in which the permanent magnet element's magnetic field flux penetration in the clutch liquid gap is low, and an engaged position in which the magnetic field flux penetration in the clutch liquid gap is high. In its engaged position, the permanent magnet is close to the clutch liquid gap, and in the disengaged position, the permanent magnet element is more distant from the clutch liquid gap. The permanent magnet element does not necessarily co-rotate with the input clutch body, but can be provided to co-rotate with the input shaft.

A pneumatic control circuit for moving and shifting the permanent magnet element between its engaged and its disengaged position is provided. The pneumatic control circuit comprises a pneumatic actuation chamber which is connected to the vacuum chamber of the brake assistance unit via a pneumatic conduit and also comprises a piston means in the actuation chamber. The piston means directly shifts the permanent magnet into its engaged position when a relatively high absolute pressure is present in the vacuum chamber of the brake assistance unit. A relatively high absolute pressure is an absolute pressure above the defined absolute maximum pressure value. The piston means is pretensioned by a passive pretension element into the disengaged or engaged position. The passive pretension element acts against the absolute pressure in the actuation chamber which is equal to the pressure in the vacuum chamber.

The pretensioning element can, for example, shift the piston means into its engaged position, whereby the piston means is shifted by the pressure in the actuation chamber into the disengaged position when the absolute pressure is below the defined maximum pressure value.

The described pneumatic control circuit is relatively simple and reliable. No electric control or actuation means are needed. The magneto-rheological clutch can generate relatively high clutch forces even if the actuation forces for moving the permanent magnet element between its engaged and disengaged position is relatively low.

In an embodiment of the present invention, the piston means can, for example, be defined by the permanent magnet element itself, and the pneumatic actuation chamber can, for example, be defined by a cavity defined and surrounded by the input clutch body and the output clutch body. No separate pneumatic actuator is provided so that the vacuum pump including the clutch and the clutch actuation means is relatively simple. The permanent magnet element defining the piston means can, for example, be provided to be shiftable in an axial direction.

In an embodiment of the present invention, the pneumatic actuation chamber can, for example, be provided with a vacuum inlet which is connected with the pneumatic conduit. A venting channel can, for example, be provided to vent the actuation chamber in pneumatic opposition to the vacuum inlet with atmospheric pressure. At one side of the piston means, the actuation chamber is pneumatically connected to the vacuum chamber of the brake assistance unit via the pneumatic conduit and the vacuum inlet, whereas at the other side of the piston means, the actuation chamber is connected to atmospheric pressure via the venting channel.

In an embodiment of the present invention, the clutch bodies can, for example, be cup-shaped and form a cup-shaped clutch liquid gap between them. The clutch bodies are provided with a disk-like and with a cylindrical section. The permanent magnet is, in its engaged position, positioned inside the ringbody-like shaped cavity defined by the cup-shaped clutch liquid gap. Since the clutch liquid gap between the two clutch bodies is not only disk-like shaped, but also comprises a cylindrical portion, the total gap surface area is significantly increased and is provided with a long lever arm of force to transmit high torque values without increasing the total diameter of the clutch.

An embodiment of the present invention is described below under reference to the drawings.

Figure 2:
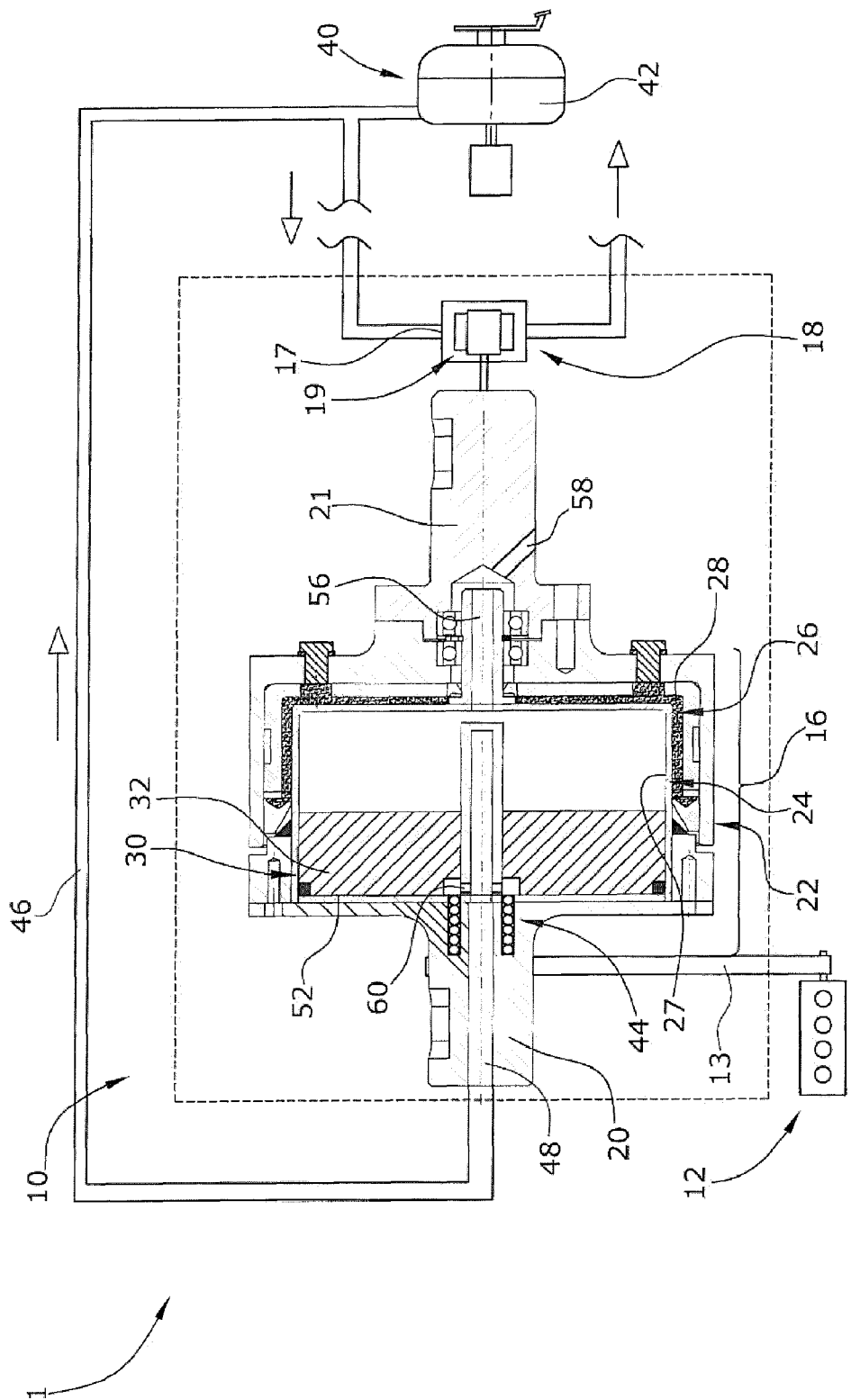
FIG. 2 shows the pneumatic brake assistance arrangement with a disengaged magneto-rheological clutch in longitudinal section.

FIGS. 1 and 2 show a pneumatic brake assistance arrangement 1 consisting of an internal combustion engine 12, a mechanical vacuum pump 10 directly driven by the internal combustion engine 12, and a vacuum-driven pneumatic brake assistance unit 40.

The vacuum pump 10 provides vacuum of less than 100 mbar to the vacuum-driven pneumatic brake assistance unit 40. The combustion engine 12 is mechanically directly connected to an input shaft 20 of a magneto-rheological clutch 16 of the vacuum pump 10 so that the input shaft 20 always co-rotates with a rotational speed being directly proportional to the rotational speed of the internal combustion engine 12.

The magneto-rheological clutch 16 is arranged between the input shaft 20 and an output shaft 21. The magneto-rheological clutch 16 connects the input shaft 20 with the output shaft 21 in the engaged clutch state, as shown in FIG. 1, and disconnects the output shaft 21 from the input shaft 20 in the disengaged state, as shown in FIG. 2. The output shaft 21 of the magneto-rheological clutch 16 is directly coupled to a vacuum pumping unit 18 with a pump rotor 19. The magneto-rheological clutch 16 is provided with two clutch bodies 22,24, output clutch body 22 and input clutch body 24, defining a clutch liquid gap 26 therebetween filled with a magneto-rheological clutch liquid 28, an axially shiftable permanent magnet element 30, a pretension element 44 designed as a spring, and a pneumatic means for pneumatically actuating the permanent magnet element 30 to move it between the engaged and the disengaged position.

The clutch bodies 22,24 are both cup-shaped so that the small clutch liquid gap 26 defined between the clutch bodies 22,24 is in the form of a cup-shaped cavity 27 having a disk-like ring portion and a cylindrical portion. The permanent magnet element 30 is provided as a circular permanent magnet ring body 32 which is provided axially shiftable within the cavity defined by the input clutch body 24 and the output clutch body 22.

In the engaged position as shown in FIG. 1, the circular permanent magnet ring body 32 is close to both portions of the clutch liquid gap 26 containing the magneto-rheological clutch liquid 28 therein so that the magnetic field generated by the permanent magnet element 30 penetrates the magneto-rheological clutch liquid 28 inside the clutch liquid gap 26 with a maximum magnetic flux. In the disengaged position of the permanent magnet element 30, as shown in FIG. 2, the magnetic field flux penetrating the clutch liquid gap 26 is relatively low so that the viscosity of the magneto-rheological clutch liquid is relatively low.

The axially shiftable permanent magnet element 30 is pretensioned by a pretension element 44 into its engaged position which is shown in FIG. 1. This arrangement makes the magneto-rheological clutch 16 failsafe because the permanent magnet element 30 is always pushed into its engaged position if the pneumatic actuation should fail.

The cylindrical cavity enclosed by the input clutch body 24 and the output clutch body 22 serves as a pneumatic actuation chamber 50 which is pneumatically directly connected via a vacuum inlet 60, an axial bore 48 and a pneumatic conduit 46 to the vacuum chamber 42 of the vacuum-driven pneumatic brake assistance unit 40. The vacuum chamber 42 is connected with a suction port 17 of the vacuum pumping unit 18. At the other axial end of the pneumatic actuation chamber 50, venting channels 56,58 are provided to constantly provide atmospheric pressure to this axial end of the pneumatic actuation chamber 50. The permanent magnet element 30 defines a piston means 52 inside the pneumatic actuation chamber 50. The vacuum chamber 42 of the vacuum-driven pneumatic brake assistance unit 40, the vacuum pumping unit 18, the pneumatic actuation chamber 50 with the piston means 52 and the pneumatic conduit 46 define a pneumatic control circuit which provides that the absolute pressure in the vacuum chamber 42 of the vacuum-driven pneumatic brake assistance unit 40 remains always below a critical maximum pressure value.

When the internal combustion engine 12 rotates, the input clutch body 24 also rotates. As long as the absolute pressure in the vacuum chamber 42 of the vacuum-driven pneumatic brake assistance unit 40 is above a defined and constant maximum pressure value, the absolute pressure in the pneumatic actuation chamber 50 is not low enough to push the permanent magnet element 30 into its disengaged position so that the permanent magnet element 30 remains in the engaged position, as shown in FIG. 1. Since the magnetic field penetrating in the clutch liquid gap 26 is relatively high in the engaged position, the magneto-rheological clutch liquid 28 has a high viscosity. As a consequence, the magneto-rheological clutch 16 is engaged and the pump rotor 19 of the vacuum pumping unit 18 co-rotates with the input shaft 20. The rotating vacuum pumping unit 18 evacuates the vacuum chamber 42 of the vacuum-driven pneumatic brake assistance unit 40 until the absolute pressure in the vacuum chamber 42 and in the connected pneumatic actuation chamber 50 falls below the defined maximum pressure value which is defined by the strength of the pretensioning element 44. When the absolute pressure in the pneumatic actuation chamber 50 is below the defined maximum pressure value, the force generated by the pressure difference between the chamber sections at both sides of the permanent magnet element 30 is strong enough to shift the piston means 50 defined by the permanent magnet element 30 into the disengaged position against the pretension of the pretensioning element 44, as shown in FIG. 2.

The present invention is not limited to embodiments described herein; reference should be had to the appended claims.

What is claimed is:

1. A pneumatic brake assistance arrangement for an internal combustion engine, the pneumatic brake assistance arrangement comprising:
    a pneumatic conduit;
    a vacuum brake assistance unit comprising a vacuum chamber; and
    a vacuum pump comprising,
        an input shaft configured to be directly driven by the internal combustion engine,
        a pumping unit comprising a pump rotor and a suction port, the vacuum chamber of the vacuum brake assistance unit being connected with the suction port of the pumping unit, and
        a magneto-rheological clutch arranged between the input shaft and the pump rotor, the magneto-rheological clutch comprising,
        an input clutch body,
        an output clutch body,
        a closed clutch liquid gap arranged between the input clutch body and the output clutch body, the closed clutch liquid gap being filled with a magneto-rheological clutch liquid,
        a permanent magnet element configured to be shiftable between an engaged position wherein a magnetic field of the permanent magnet element penetrates the closed clutch liquid gap with a high magnetic flux, and a disengaged position wherein the magnetic field of the permanent magnet element is less than in the engaged position, and
        a pneumatic control circuit configured to move the permanent magnet element between the engaged position and the disengaged position, the pneumatic control circuit comprising a pneumatic actuation chamber comprising a piston and a passive pretension element,
    wherein,
    the pneumatic actuation chamber is connected to the vacuum chamber of the vacuum brake assistance unit via the pneumatic conduit,
    the piston is configured to directly shift the permanent magnet element into the engaged position when a high pressure exists in the vacuum chamber, and
    the passive pretension element is configured to pretention the piston so that the permanent magnet element is in the disengaged position or in the engaged position.

2. The pneumatic brake assistance arrangement as recited in claim 1, further comprising a cavity defined by the input clutch body and the output clutch body, wherein, the piston is defined by the permanent magnet element, and the pneumatic actuation chamber is defined by the cavity.

3. The pneumatic brake assistance arrangement as recited in claim 1, wherein the pneumatic actuation chamber further comprises a vacuum inlet connected with the pneumatic conduit.

4. The pneumatic brake assistance arrangement as recited in claim 3, further comprising a venting channel configured to vent the actuation chamber with atmospheric pressure in a pneumatic opposition to the vacuum inlet.

5. The pneumatic brake assistance arrangement as recited in claim 1, wherein the permanent magnet element is arranged so as to be shiftable in an axial direction.

6. The pneumatic brake assistance arrangement as recited in claim 1, wherein,
    the input clutch body and the output clutch body are each configured to have a cup-shape so that the closed clutch liquid gap is provided as a cup-shaped gap defining a cup-shaped cavity between the input clutch body and the output clutch body, and
    the permanent magnet element, in the engaged position, is positioned inside the cup-shaped cavity.

7. The pneumatic brake assistance arrangement as recited in claim 1, wherein,
    the piston directly shifts the permanent magnet element into the engaged position when the high pressure is present in the vacuum chamber, and
    the piston is pretensioned by the passive pretension element so that the permanent magnet element is in the engaged position.

* * * * *